(12) United States Patent
Sugiura et al.

(10) Patent No.: US 8,382,129 B2
(45) Date of Patent: Feb. 26, 2013

(54) VEHICLE STABILIZER

(75) Inventors: Hironobu Sugiura, Yokohama (JP); Shigeru Kuroda, Yokohama (JP); Kiyoshi Kurimoto, Yokohama (JP); Yurika Goto, Yokohama (JP); Shinichi Nishizawa, Wixom, MI (US)

(73) Assignees: NHK Spring Co., Ltd., Yokohama-shi (JP); NHK International Corporation, Wixom, MI (US)

( * ) Notice: Subject to any disclaimer, the term of this patent is extended or adjusted under 35 U.S.C. 154(b) by 0 days.

(21) Appl. No.: 13/471,201

(22) Filed: May 14, 2012

(65) Prior Publication Data

US 2012/0223499 A1 Sep. 6, 2012

Related U.S. Application Data

(60) Division of application No. 12/797,807, filed on Jun. 10, 2010, now abandoned, which is a continuation of application No. PCT/JP2009/053616, filed on Feb. 20, 2009.

(30) Foreign Application Priority Data

Feb. 21, 2008 (JP) ................................. 2008-040500

(51) Int. Cl.
*B60G 21/055* (2006.01)
*F16F 1/16* (2006.01)
(52) U.S. Cl. ..... 280/124.107; 280/124.152; 267/140.12; 267/141.2
(58) Field of Classification Search ........... 280/124.106, 280/124.107, 124.152, 124.166, 124.169, 280/124.149, 124.167; 267/273, 276, 140.12, 267/141.2, 141.4, 141.5, 183, 184, 185, 188
See application file for complete search history.

(56) References Cited

U.S. PATENT DOCUMENTS

| 5,190,269 | A | 3/1993 | Ikeda et al. |
| 5,224,790 | A | 7/1993 | Hein |
| 5,413,374 | A | 5/1995 | Pierce |
| 5,588,209 | A | 12/1996 | Fisher et al. |
| 5,884,926 | A | 3/1999 | Muzio et al. |
| 6,474,631 | B2 | 11/2002 | Hadano et al. |
| 7,010,950 | B2 | 3/2006 | Cai et al. |
| 7,828,308 | B2 | 11/2010 | Hansson et al. |
| 2002/0170177 | A1 | 11/2002 | Koyama et al. |

(Continued)

FOREIGN PATENT DOCUMENTS

| DE | 199 12 268 A1 | 9/2000 |
| EP | 0 597 614 A1 | 5/1994 |

(Continued)

OTHER PUBLICATIONS

International Search Report and Written Opinion dated May 26, 2009 in counterpart International Application No. PCT/JP2009/053616.

(Continued)

*Primary Examiner* — Joseph Rocca
(74) *Attorney, Agent, or Firm* — Holtz, Holtz, Goodman & Chick, PC (57) ABSTRACT

A stabilizer bar is intended for use in a vehicle, and a torsion part of the stabilizer bar is fixed to the vehicle body by a fixing member. A resin sheathing is provided integrally on an outer peripheral surface of the stabilizer bar. The fixing member is composed of the sheathing, a rubber bush disposed on the outer periphery of the sheathing, and a mounting fixture for mounting the rubber bush on the vehicle body side so as to cover the outer periphery of the rubber bush. The sheathing and the rubber bush are immovably assembled to each other. Thus, there may be provided a vehicle stabilizer, highly durable, easily mountable and replaceable, low-cost, and highly operable.

8 Claims, 5 Drawing Sheets

U.S. PATENT DOCUMENTS

| | | |
|---|---|---|
| 2003/0175073 A1 | 9/2003 | Funke |
| 2004/0004336 A1 | 1/2004 | Zandbergen et al. |
| 2005/0029769 A1 | 2/2005 | Furuyama et al. |
| 2005/0214560 A1 | 9/2005 | Yue et al. |
| 2005/0236794 A1 | 10/2005 | Cai et al. |
| 2006/0082093 A1 | 4/2006 | Sterly et al. |
| 2006/0200990 A1 | 9/2006 | Koyama et al. |
| 2007/0085295 A1 | 4/2007 | Johnson et al. |
| 2007/0241526 A1 | 10/2007 | Plante |
| 2007/0257462 A1 | 11/2007 | Fader |
| 2011/0115182 A1 | 5/2011 | Kuroda |

FOREIGN PATENT DOCUMENTS

| | | |
|---|---|---|
| EP | 0 900 677 A1 | 3/1999 |
| EP | 1 238 750 A2 | 9/2002 |
| EP | 2 305 493 A1 | 4/2011 |
| GB | 2 239 440 A | 7/1991 |
| GB | 2 263 250 A | 7/1993 |
| GB | 2 417 054 A | 2/2006 |
| JP | 2001-270315 A | 10/2001 |
| JP | 2002-331326 A | 11/2002 |
| JP | 2004-34979 A | 2/2004 |
| JP | 2004-359131 A | 12/2004 |
| JP | 2006-27311 A | 2/2006 |
| KR | 10-2005-0092894 A1 | 9/2005 |
| WO | WO 2006/126772 A1 | 11/2006 |
| WO | WO 2007/047051 A2 | 4/2007 |
| WO | WO 2007/126359 A1 * | 11/2007 |

OTHER PUBLICATIONS

Extended European Search Report (EESR) dated Dec. 5, 2011 (in English) in counterpart European Application No. 09711942.4.
Korean Office Action dated Dec. 20, 2011 (and English translation thereof) in counterpart Korean Application No. 10-2010-7015746.
Japanese Office Action dated Oct. 23, 2012 (and English translation thereof) in counterpart Japanese Application No. 2008-040500.

* cited by examiner

VEHICLE STABILIZER

CROSS-REFERENCE TO RELATED APPLICATIONS

This is a Divisional of U.S. application Ser. No. 12/797,807, filed Jun. 10, 2010 now abandoned, which is a Continuation application of PCT Application No. PCT/JP2009/053616, filed Feb. 20, 2009, which was published under PCT Article 21(2) in English.

This application is based upon and claims the benefit of priority from prior Japanese Patent Application No. 2008-040500, filed Feb. 21, 2008, the entire contents of which are incorporated herein by reference.

BACKGROUND OF THE INVENTION

1. Field of the Invention

The present invention relates to a vehicle stabilizer provided with a stabilizer bar.

2. Description of the Related Art

A vehicle stabilizer provided with a stabilizer bar connects the stabilizer bar to a suspension of a vehicle and stabilizes the attitude of the vehicle by utilizing a reaction force of the stabilizer bar. For example, the vehicle stabilizer is constructed so that opposite ends of the U-shaped stabilizer bar are coupled to operating parts of the suspension, and a torsion part of the stabilizer bar is fixed to a vehicle body by a fixing member and serves to receive a torsional reaction force.

Conventionally, a rubber bush is used for the fixing member to fix the torsion part of the stabilizer bar to the vehicle body frame. Specifically, the rubber bush is provided with a hole portion through which the stabilizer bar is passed and a notch for opening the hole portion. The notch is opened in assembling the rubber bush to the stabilizer, and the rubber bush is attached to the vehicle body frame by means of bolts or the like with the aid of, for example, a U-shaped mounting fixture.

Also known is an example in which a rubber bush is fixed to a stabilizer bar with an adhesive agent or by vulcanization molding or the like. In the case of this rubber bush, no gap is formed between the stabilizer bar and the rubber bush. If a torsional motion acts on the stabilizer bar as the suspension moves up and down, the rubber bush is deformed correspondingly. Thus, functions and effects for the stabilizer can be obtained by the deformation of the rubber bush as well as by a torsional action of the torsion part.

[Patent Document 1] Jpn. Pat. Appln. KOKAI Publication No. 2006-27311

However, the fixing member configured so that the stabilizer bar is passed through the hole portion of the rubber bush and fixed to the frame by means of the mounting fixture cannot fully restrain the movement of the stabilizer bar.

In some cases, therefore, the stabilizer bar may rotate around its axis or move axially with respect to the rubber bush. Thereupon, a noise may be produced by the stabilizer bar and the rubber bush that rub against each other, and the stabilizing effect of the stabilizer may vary.

Further, fixing the rubber bush to the stabilizer bar requires, for example, a process for holding them in a heating furnace for a long time and entails a high cost. In replacing the rubber bush, moreover, the rubber bush must be removed from the stabilizer bar by cutting, melting, or some other operation. In addition, a new rubber bush must be fixed to the stabilizer bar with an adhesive agent or by vulcanization molding or the like, thus the replacement of the rubber bush requires much labor.

BRIEF SUMMARY OF THE INVENTION

A fixing member for fixing a torsion part of a stabilizer bar of the vehicle stabilizer to a vehicle body is composed of a sheathing provided integrally on an outer surface of the stabilizer bar, a rubber bush disposed on the outer periphery of the sheathing, and a mounting fixture for mounting the rubber bush on the vehicle body so as to cover the outer periphery of the rubber bush. The sheathing and the rubber bush are immovably assembled to each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The following is a description of one embodiment of a vehicle stabilizer according to the present invention.

Figure 1:
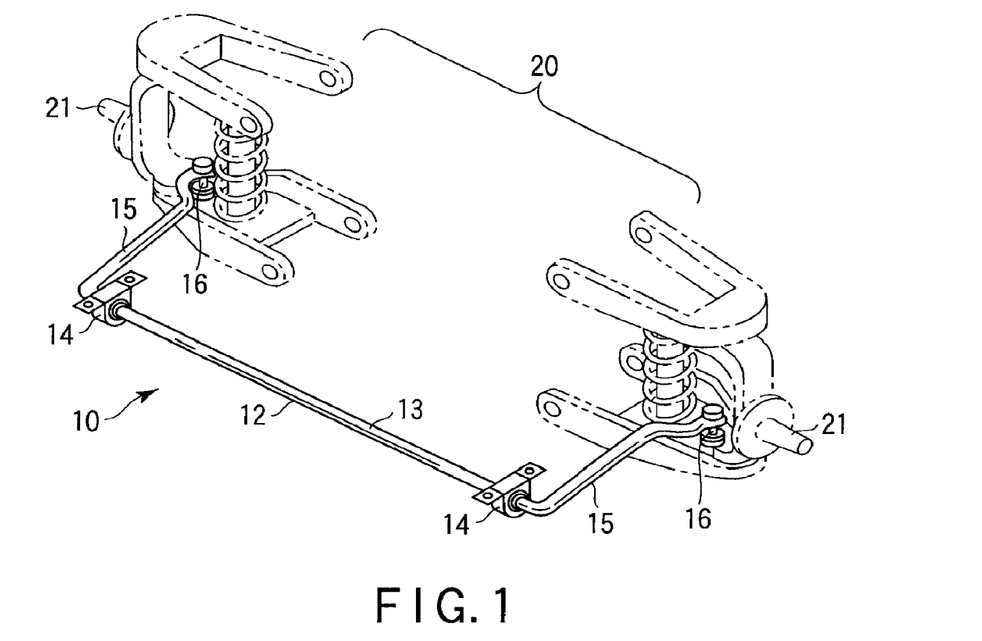
FIG. 1 is a perspective view showing one embodiment of a stabilizer according to the present invention.

FIG. 1 shows a suspension 20 for front wheels of a vehicle provided with a stabilizer 10. The suspension 20 (indicated by two-dot chain lines) is a double-wishbone suspension. The front wheels and the like (not shown) are mounted on left- and right-hand axle portions 21.

The stabilizer 10 is composed of a stabilizer bar 12, fixing members 14 that fix the stabilizer bar 12 to a vehicle body (not shown), stabilizer links 16 that connect end portions of the stabilizer bar 12 individually to operating parts of the suspension 20, etc.

The stabilizer bar 12 is composed of a torsion part 13 spanning the width of the vehicle body and arm portions 15 individually formed on the opposite ends of the torsion part 13 and which is substantially U-shaped. When the operating parts of the suspension 20 move up and down, the arm portions 15 of the stabilizer bar 12 follow such actions, whereupon the torsion part 13 is twisted so that the suspension 20 is kept stable by its torsional reaction force.

Figure 2:
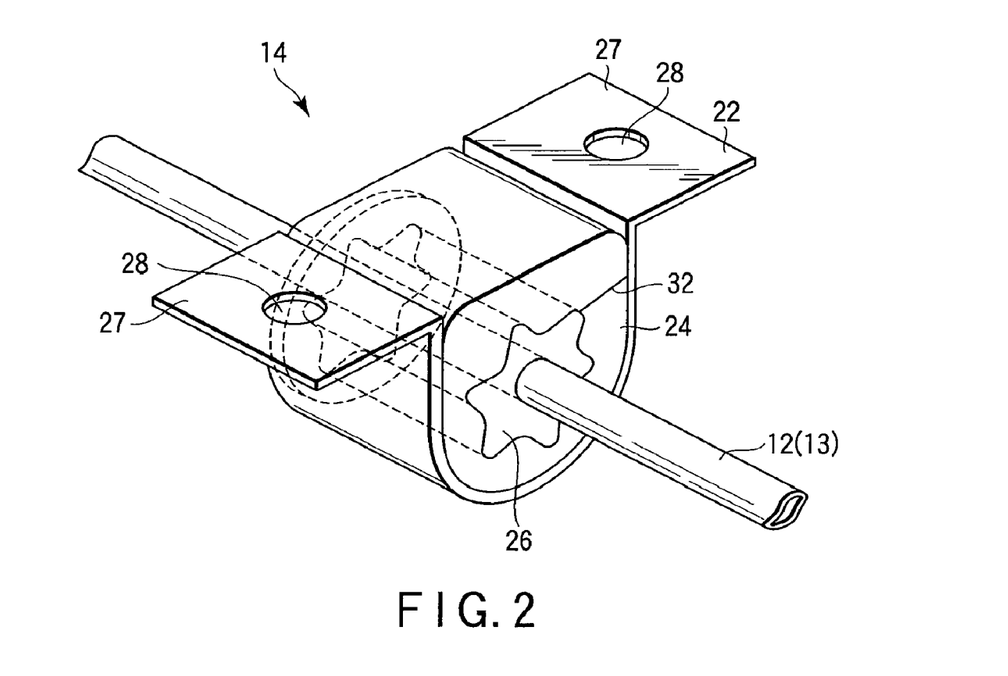
FIG. 2 is a perspective view showing a fixing member of the stabilizer shown in FIG. 1.

The pair of fixing members 14 are provided individually on the axially opposite ends of the torsion part 13. As shown in FIG. 2, each fixing member 14 is composed of a mounting fixture 22, a rubber bush 24, and a sheathing 26, and is fixed to a frame part (not shown) of the vehicle body.

Figure 3:
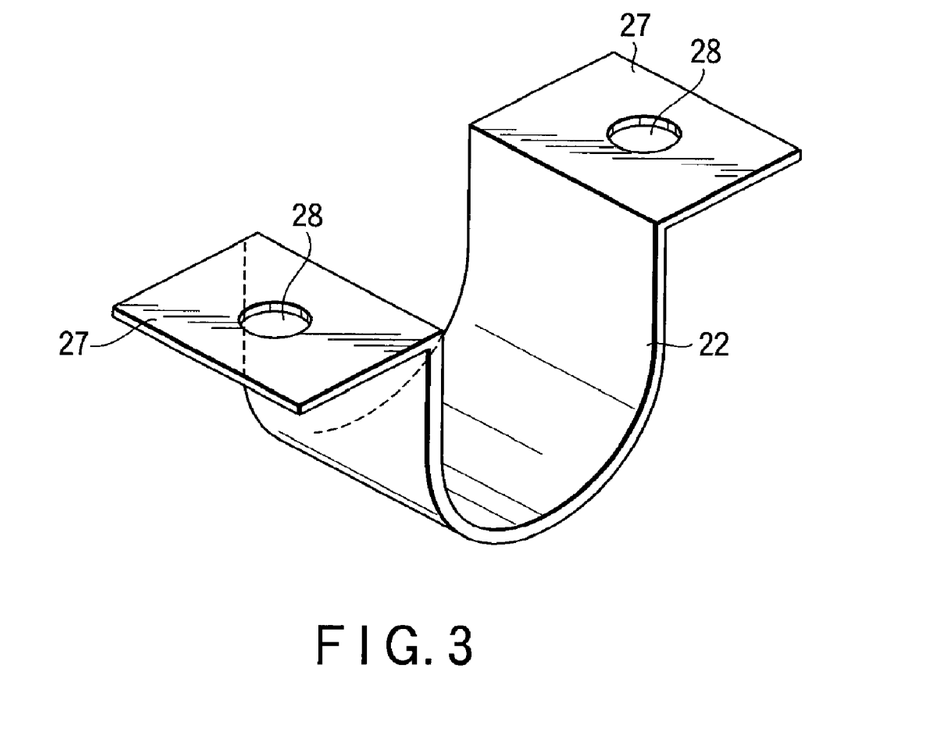
FIG. 3 is a perspective view showing a mounting fixture of the stabilizer shown in FIG. 1.

As shown in FIG. 3, the mounting fixture 22 is a substantially U-shaped metal plate, and lugs 27 extend individually sideways from the opposite ends of the fixture 22. A bolt hole 28 is formed in each lug 27. A bolt (not shown) is passed through each bolt hole 28, whereby the mounting fixture 22 is fixed to the frame of the vehicle body.

Figure 4:
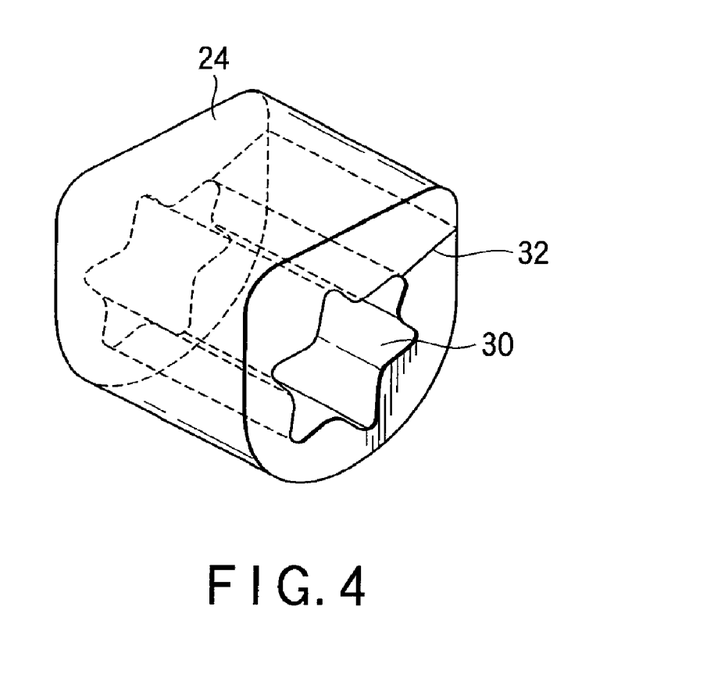
FIG. 4 is a perspective view showing a rubber bush of the stabilizer shown in FIG. 1.

The rubber bush 24 is formed of a rubber material with a predetermined hardness and has a shape suitable for the U-shape inside the mounting fixture 22. Further, the rubber bush 24 is formed with a through-hole 30 that penetrates the substantial center of the rubber bush 24. The through-hole 30 has an inner surface shape corresponding to the external shape of the sheathing 26. Furthermore, the rubber bush 24 is formed with a cut portion 32 that extends from inside the through-hole 30 to the outer surface of the rubber bush 24. The cut portion 32 in the rubber bush 24 enables the through-hole 30 to open above and below the cut portion 32.

Figure 5:
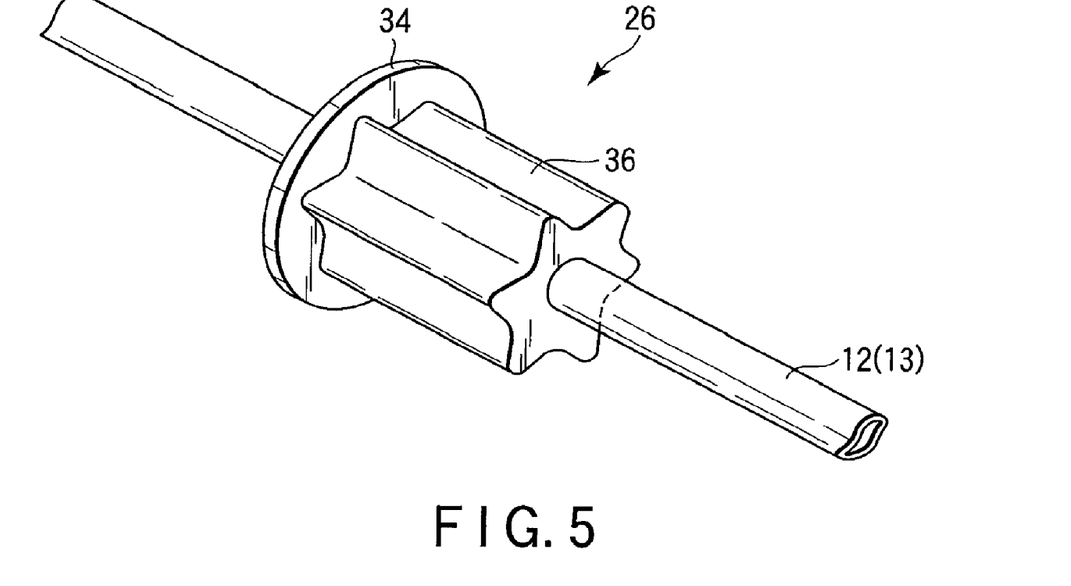
FIG. 5 is a perspective view showing a sheathing of the stabilizer shown in FIG. 1.

The sheathing 26 is made of a resin and composed of a collar portion 34 and a cylinder portion 36 continuous with the collar portion 34, as shown in FIG. 5. The sheathing 26 is formed by, for example, injection molding and is integrally fixed to the stabilizer bar 12.

Figure 6:
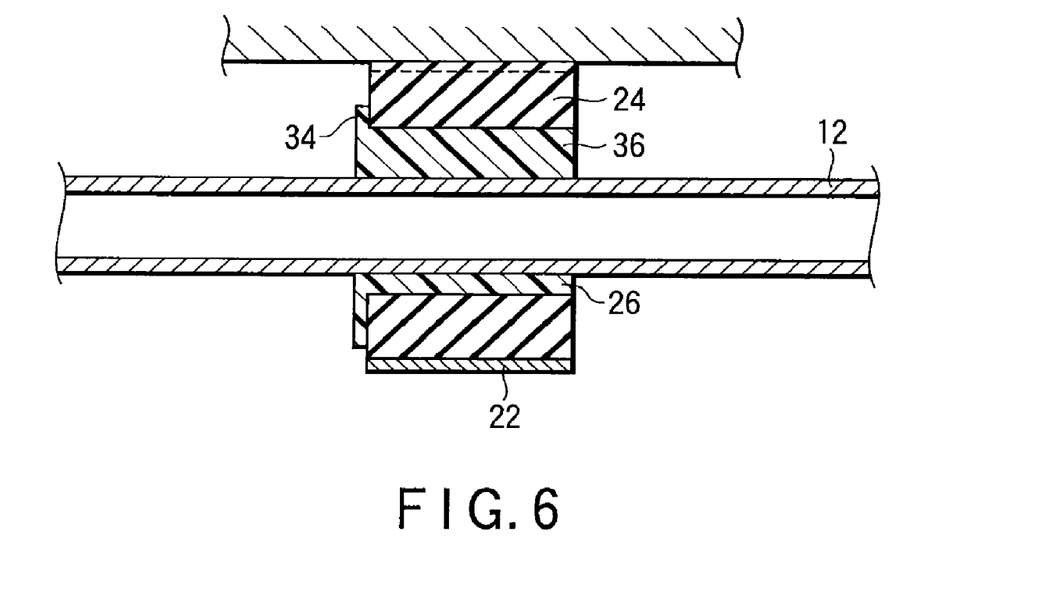
FIG. 6 is a sectional view showing the fixing member of the stabilizer shown in FIG. 1.

The collar portion 34 is a discoid that is formed substantially at right angles to the stabilizer bar 12, as shown in FIG. 6. The cylinder portion 36 is formed substantially parallel to the axis of the stabilizer bar 12 and has a rugged configuration on its outer peripheral surface. The rugged configuration is a point-symmetric shape such that its cross section perpendicular to the central axis of the stabilizer bar 12 has six uniform tops. FIG. 6 is a sectional view of the fixing member 14 taken along a line that passes through the tops and bottoms of the rugged configuration of cylinder portion 36.

Further, the sheathing 26 basically has a sufficient hardness such that it cannot be easily deformed and is fixed in close proximity to the stabilizer bar 12 without a gap. The sheathing 26 is molded after the outer surface of the stabilizer bar 12 is shot-peened and before the outer surface of the stabilizer bar 12 is coated. Fine irregularities are formed on the surface of the stabilizer bar 12 by shot peening, so that the bite of the sheathing 26 on the stabilizer bar 12 is improved by the anchor effect of the irregularities.

The shot peening may be that conventionally performed to improve the durability and the like of the stabilizer bar 12. Further, any other processing means may be used for the purpose as long as the bite of the resin on the stabilizer bar 12 can be improved. Depending on the type of the resin, furthermore, the sheathing 26 may be molded on the stabilizer bar 12 with a smooth surface provided that the resin of the sheathing 26 and the stabilizer bar 12 to be combined are fully fixed. If the adhesion of the resin to the stabilizer bar 12 is unsatisfactory, in contrast with this, a molded portion of the sheathing 26 may additionally be knurled or serrated after being shot-peened.

Further, the rubber bush 24 has an external shape larger than the internal shape of the mounting fixture 22, and the through-hole 30 is formed with a shape smaller than the external shape of the cylinder portion 36 of the sheathing 26. Thus, if the mounting fixture 22 is fitted on the outside of the rubber bush 24, which is mounted on the sheathing 26, and fixed to the vehicle body frame, the rubber bush 24 is pressed inward by both the sheathing 26 and the mounting fixture 22. Accordingly, the fixing member 14 that is fixed to the vehicle body frame is kept in a state such that a compressive force (preload) is continually applied to the inside of the rubber bush 24. Preferably, the preload should be set to a sufficiently large value such that it cannot be reduced to zero when the stabilizer 10 operates.

The through-hole 30 may be formed with a shape equal to or larger than the external shape of the sheathing 26. Also in this case, the through-hole 30 is formed so that the sheathing 26 is pressed inward and subjected to a compressive force by the rubber bush 24 when the rubber bush 24 is attached to the mounting fixture 22.

The following is a description of functions and effects of the stabilizer 10.

Since the sheathing 26 is formed on the surface of the stabilizer bar 12 by injection molding, the stabilizer bar 12 and the sheathing 26 closely contact each other, thereby preventing water or dust from infiltrating or adhering between them. Accordingly, the surface of the stabilizer bar 12 between the stabilizer bar 12 and the sheathing 26 can be prevented from rusting, so that its durability can be improved. Since the sheathing 26 and the stabilizer bar 12 cannot be dislocated from each other, moreover, no noise can be produced.

Since the sheathing 26 is formed on the stabilizer bar 12 by injection molding, it can be provided with ease. Further, the sheathing 26 can be securely fixed to the stabilizer bar 12 by the shot peening for the stabilizer bar 12 before molding without requiring any special processing before the injection molding. Thus, the time required for labor and processing can be shortened, so that the manufacturing cost can be reduced considerably, as compared with the case where a conventional rubber bush is adhesively bonded or vulcanization-molded.

The rubber bush 24 can be opened at its cut portion 32 and assembled to the sheathing 26, so that the stabilizer bar 12 can be easily attached to the vehicle body frame. Since the rubber bush 24 and the sheathing 26 are not adhesively bonded, moreover, the rubber bush 24 can be easily removed from the sheathing 26. Thus, the rubber bush 24 can be replaced by a simple operation, so that the replacement cost can be reduced.

Since the sheathing 26 is in close contact with the rubber bush 24, the stabilizer effect can be fully exhibited. Let it be supposed that a wheel on one side drops into a depression so that one side of the suspension 20 lowers while the vehicle is running. Thereupon, an angle is formed or extended between the left- and right-hand arm portions 15, which twists the torsion part 13 and produces a reaction force. As the arm portions 15 then rock, the sheathings 26 are also rotated around their respective axes, so that the cylinder portions 36 rotate, thereby compressing the rubber material of the rubber bushes 24 between the tops of the cylinder portions 36 in the rotating direction of the stabilizer bar 12. Thereupon, the compressive reaction force of the rubber bushes 24 is transmitted to the arm portions 15, whereby the responsiveness at the initial stage of rolling is improved, so that the driving stability of the vehicle is enhanced.

Since the faculty of the stabilizer can be partially allocated to the rubber bushes 24 with the sheathings 26 fixed to the stabilizer bar 12, the rigidity and spring constant of the stabilizer bar 12 can be reduced. Thus, the stabilizer 10 can be reduced in weight and cost.

The sheathing 26 may be fixed to the stabilizer bar 12 by adhesive bonding or welding instead of injection molding. Although the sheathing 26 should preferably be formed of a resin, moreover, it may alternatively be formed of another material, e.g., hard rubber, synthetic rubber, etc.

The following is a description of another example of the stabilizer 10.

Figure 7:
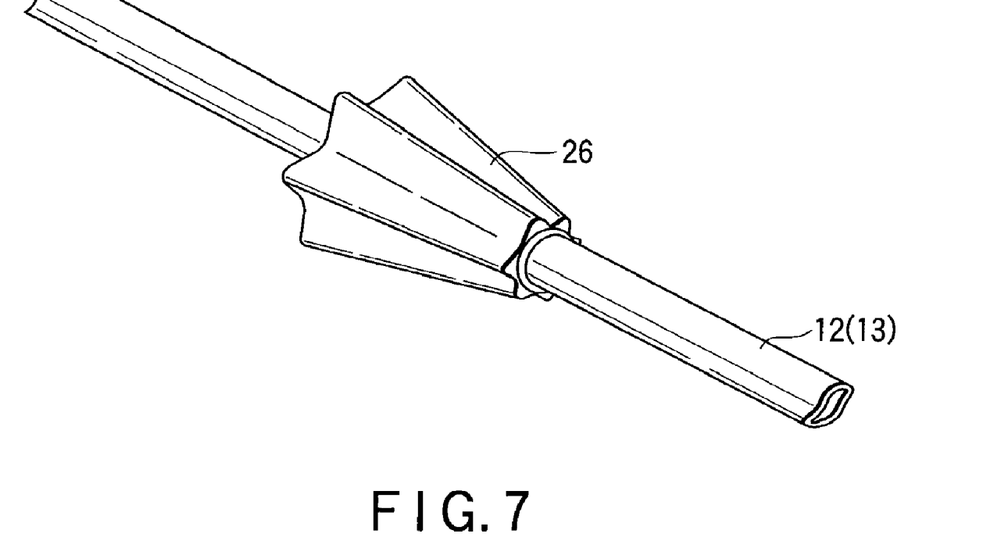
FIG. 7 is a perspective view showing another example of the sheathing.

FIG. 7 shows a sheathing 26. In this example, the sheathing 26 has an axially rugged configuration on its outer peripheral surface. It is formed so as not to be circumferentially dislocated from a rubber bush 24 and is axially tapered on one side. Further, a rugged configuration for integral assembly is formed on the inner surface of a through-hole 30 of the rubber bush 24 so as to correspond to the rugged configuration of the sheathing 26.

When the sheathing 26 formed in this manner is assembled to the rubber bush 24, the sheathing 26 is prevented from rotating circumferentially and from moving axially in a direction in which the diameter of the sheathing 26 increases. Thus, in the stabilizer 10 in which such sheathings 26 are bilaterally molded on a stabilizer bar 12, fixing members 14 can prevent the stabilizer bar 12 from rotating around the axis and moving axially, so that the same effect as aforementioned can be exhibited.

Figure 8:
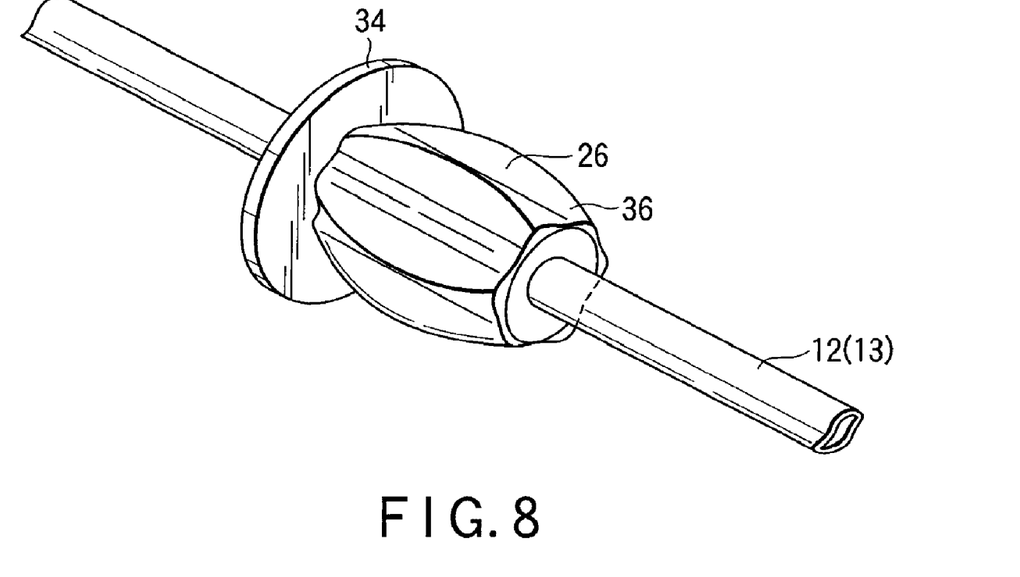
FIG. 8 is a perspective view showing another example of the sheathing.

Further, FIG. 8 shows another example. In this example, each top part of a cylinder portion 36 has a convex shape in cross-section when cut along a plane that passes through the central axis of a stabilizer bar 12. If a sheathing 26 formed in this manner is assembled to a rubber bush 24 that has a through-hole 30 corresponding to this rugged configuration, circumferential dislocation can be restrained by the top parts. Since the top parts are convex with respect to the axial direction, moreover, an axial movement can also be restrained. In this example, each top part of the cylinder portion 36 may have a concave shape, depressed in the center, instead of being convex.

Figure 9:
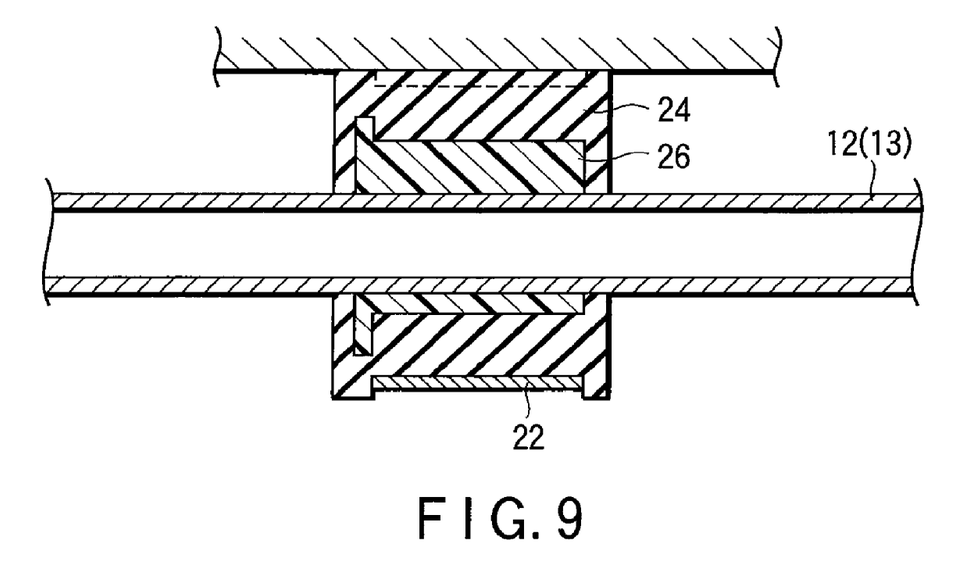
FIG. 9 is a perspective view showing another example of the fixing member.

FIG. 9 shows an example in which the transverse width of a rubber bush 24 is longer than that of a sheathing 26 along the axis of a stabilizer bar 12. Thus, the sheathing 26 covers the inside of the rubber bush 24 so that water, dust, etc., can be prevented from infiltrating between the rubber bush 24 and the sheathing 26. Further, the sheathing 26 may be formed so that its axial width is longer than that of the rubber bush 24 along the stabilizer bar 12, that is, the sheathing 26 is exposed on the opposite sides of the rubber bush 24.

Although the sheathing 26 is formed axially with the stabilizer bar 12 in the example described above, they need not always be coaxial with each other. Further, the cross section of the stabilizer bar 12 may be of any desired shape other than a circular shape and may be either hollow or solid. Although the fixing member 14 is provided on the frame of the vehicle body, the distal end of the arm portion may be attached to the frame.

The sheathing 26 should only be formed with one irregularity provided that the rubber bush 24 and the sheathing 26 can engage each other at least circumferentially. The collar portion 34 may be formed in any desired position along the axis, e.g., in the center of the sheathing 26, instead of being formed on the axial end portion of the sheathing 26.

The outer surface of the sheathing 26 and the inner surface of the rubber bush 24 need not be in close contact with each other throughout the circumference of the sheathing 26. Further, the sheathing 26 and the rubber bush 24 may be configured so that a gap is formed between them when the stabilizer 10 is driven to twist the stabilizer bar 12.

Furthermore, the sheathing 26 may be provided with a projection member that is configured to be inserted through the inner surface of the rubber bush 24. Specifically, the projection member may be inserted into a crack that is formed in the inner wall surface of the through-hole 30 of the rubber bush 24 by the projection member. Alternatively, a plurality of projections may be formed on the surface of the sheathing 26 and caused to engage with the inner surface of the through-hole 30 of the rubber bush 24.

The rubber bush 24 may be attached to the sheathing 26 through the axial end of the stabilizer bar 12 without being formed with the cut portion 32.

The mounting fixture 22 may be fitted into a hollow that is formed in the outer peripheral surface of the rubber bush 24. If this is done, the rubber bush 24 can be prevented from being disengaged from the mounting fixture 22 even when the rubber bush 24 is subjected to a force along the axis of the stabilizer bar 12.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle stabilizer comprising:
   a stabilizer bar; and
   a fixing member;
   wherein the fixing member includes:
      a sheathing provided integrally on an outer surface of the stabilizer bar to be integrally fixed to the stabilizer bar;
      a rubber bush disposed on an outer periphery of the sheathing; and
      a mounting fixture configured to be attached to a vehicle body in such a manner as to cover an outer periphery of the rubber bush;
   wherein the fixing member is configured to fix a torsion part of the stabilizer bar to the vehicle body and immovably assemble the sheathing and the rubber bush to each other;
   wherein the sheathing is provided by injection molding on the stabilizer bar, after the stabilizer bar is shot-peened and before a coating process;
   wherein an outer surface of the sheathing has a plurality of top parts arranged in a circumferential direction around an axis of the stabilizer bar;
   wherein each of the top parts has a convex shape in cross-section when cut along a plane that passes through the axis of the stabilizer bar;
   wherein the rubber bush is provided with a through-hole having an inner surface shape corresponding to the top parts; and
   wherein the sheathing and the rubber bush are assembled so as not to be movable relative to each other in at least one direction along the axis of the stabilizer bar due to the top parts.

2. The vehicle stabilizer according to claim 1, wherein the sheathing is provided with a collar portion extending radially from the stabilizer bar, and the sheathing and the rubber bush are assembled so as not to be movable relative to each other in at least one direction along the axis of the stabilizer bar due to engagement of the rubber bush with the collar portion.

3. The vehicle stabilizer according to claim 2, wherein each of the top parts is formed from one end of the sheathing to the collar portion along the axis of the stabilizer bar.

4. The vehicle stabilizer according to claim 1, wherein each of the top parts is formed from a first end of the sheathing to a second end of the sheathing along the axis of the stabilizer bar.

5. A vehicle stabilizer comprising:
a stabilizer bar; and
a fixing member;
wherein the fixing member includes:
- a sheathing provided integrally on an outer surface of the stabilizer bar to be integrally fixed to the stabilizer bar;
- a rubber bush disposed on an outer periphery of the sheathing; and
- a mounting fixture configured to be attached to a vehicle body in such a manner as to cover an outer periphery of the rubber bush;

wherein the fixing member is configured to fix a torsion part of the stabilizer bar to the vehicle body and immovably assemble the sheathing and the rubber bush to each other;
wherein the sheathing is provided by injection molding on the stabilizer bar, after the stabilizer bar is shot-peened and before a coating process;
wherein an outer surface of the sheathing has a plurality of top parts arranged in a circumferential direction around an axis of the stabilizer bar;
wherein each of the top parts has a tapered shape in cross-section when cut along a plane that passes through the axis of the stabilizer bar;
wherein the rubber bush is provided with a through-hole having an inner surface shape corresponding to the top parts; and
wherein the sheathing and the rubber bush are assembled so as not to be movable relative to each other in at least one direction along the axis of the stabilizer bar due to the top parts.

6. The vehicle stabilizer according to claim 5, wherein the sheathing is provided with a collar portion extending radially from the stabilizer bar, and the sheathing and the rubber bush are assembled so as not to be movable relative to each other in at least one direction along the axis of the stabilizer bar due to engagement of the rubber bush with the collar portion.

7. The vehicle stabilizer according to claim 6, wherein each of the top parts is formed from one end of the sheathing to the collar portion along the axis of the stabilizer bar.

8. The vehicle stabilizer according to claim 5, wherein each of the top parts is formed from a first end of the sheathing to a second end of the sheathing along the axis of the stabilizer bar.

* * * * *